United States Patent
Nedelcu et al.

(12) 
(10) Patent No.: US 11,775,249 B2
(45) Date of Patent: Oct. 3, 2023

(54) VIRTUAL BUTTON USING A SOUND SIGNAL

(71) Applicant: SAGEMCOM BROADBAND SAS, Rueil Malmaison (FR)

(72) Inventors: Radu Nedelcu, Rueil Malmaison (FR); Jérôme Berger, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 161 days.

(21) Appl. No.: 17/141,827

(22) Filed: Jan. 5, 2021

(65) Prior Publication Data

US 2021/0240435 A1 Aug. 5, 2021

(30) Foreign Application Priority Data

Jan. 20, 2020 (FR) ...................................... 2000518

(51) Int. Cl.
| | |
|---|---|
| H04R 29/00 | (2006.01) |
| G06F 3/16 | (2006.01) |
| G10L 25/21 | (2013.01) |
| G10L 25/51 | (2013.01) |
| H04R 1/02 | (2006.01) |
| H04R 1/04 | (2006.01) |
| H04R 1/28 | (2006.01) |
| H04R 1/40 | (2006.01) |
| H04R 3/00 | (2006.01) |
| H04R 3/04 | (2006.01) |

(52) U.S. Cl.
CPC .............. *G06F 3/165* (2013.01); *G06F 3/167* (2013.01); *G10L 25/21* (2013.01); *G10L 25/51* (2013.01); *H04R 1/025* (2013.01); *H04R 1/04* (2013.01); *H04R 1/2876* (2013.01); *H04R 1/406* (2013.01); *H04R 3/005* (2013.01); *H04R 3/04* (2013.01)

(58) Field of Classification Search
CPC ......... G06F 3/165; G06F 3/167; G10L 25/21; G10L 25/51; H04R 1/025; H04R 1/04; H04R 1/2876; H04R 1/406; H04R 3/005; H04R 3/04
USPC ..................................................... 381/56, 58
See application file for complete search history.

(56) References Cited

U.S. PATENT DOCUMENTS

| 10,157,628 | B1 | 12/2018 | Liu et al. | |
|---|---|---|---|---|
| 2010/0284529 | A1* | 11/2010 | Brasse ................... | H04M 1/82 379/377 |
| 2010/0315211 | A1 | 12/2010 | Le-Faucheur | |
| 2011/0136479 | A1 | 6/2011 | Kim et al. | |

(Continued)

FOREIGN PATENT DOCUMENTS

CN 109121046 B * 9/2020 ............... H04R 3/12

*Primary Examiner* — Ammar T Hamid
(74) *Attorney, Agent, or Firm* — Muncy, Geissler, Olds & Lowe, P.C.

(57) ABSTRACT

Electrical equipment includes a housing having a hole formed therein; a microphone positioned inside the housing and in the proximity of the hole; a loudspeaker; emitter means arranged to emit an emitted detection sound signal via the loudspeaker; and processor means arranged to acquire a received detection sound signal via the microphone, to detect in real time from the received detection sound signal whether a user's finger is or is not positioned on or in the immediate proximity of the hole, and if a finger is positioned on or in the immediate proximity of the hole to cause a predetermined action to be performed.

18 Claims, 1 Drawing Sheet

(56) References Cited

U.S. PATENT DOCUMENTS

| | | | |
|---|---|---|---|
| 2013/0010995 A1* | 1/2013 | Kim | H04R 19/016 |
| | | | 381/355 |
| 2018/0190305 A1* | 7/2018 | Younger | G11B 27/102 |
| 2018/0262831 A1* | 9/2018 | Matheja | H04R 3/00 |
| 2021/0065686 A1* | 3/2021 | Rao | G10L 21/0232 |
| 2021/0090548 A1* | 3/2021 | Debner | G10L 15/005 |

\* cited by examiner

VIRTUAL BUTTON USING A SOUND SIGNAL

The invention relates to the field of electrical equipment including a microphone and a loudspeaker.

BACKGROUND OF THE INVENTION

Some electrical equipment, e.g. such as a smartspeaker performing the function of a voice assistant, is designed to interact with a user by voice.

Such electrical equipment includes at least a microphone enabling it to acquire requests made orally by the user, and at least a loudspeaker enabling it to respond orally to the user.

Such electrical equipment also generally includes one or more buttons for giving rapid access to certain functions: starting voice interaction with the user, activating or deactivating a standby mode, switching on/off, adjusting volume, Bluetooth pairing, etc.

OBJECT OF THE INVENTION

An object of the invention is to reduce the cost of electrical equipment as described above.

SUMMARY OF THE INVENTION

In order to achieve this object, there is provided electrical equipment comprising:
  a housing having a hole formed therein;
  a microphone positioned inside the housing and in the proximity of the hole;
  a loudspeaker;
  emitter means arranged to emit an emitted detection sound signal via the loudspeaker;
  processor means arranged to acquire a received detection sound signal via the microphone, to detect in real time from the received detection sound signal whether a user's finger is or is not positioned on or in the immediate proximity of the hole, and if a finger is positioned on or in the immediate proximity of the hole to cause a predetermined action to be performed.

The electrical equipment of the invention is thus provided with a "virtual button" that enables the performance of a predetermined action to be controlled, which action may for example be activating voice interaction with a user or else activating or deactivating a standby mode.

When the electrical equipment is provided with a microphone and a loudspeaker that are used for some other function, as applies to a smartspeaker that performs a voice assistant function, implementing a virtual button is very inexpensive since the virtual button can make use of the "pre-existing" microphone and loudspeaker. A physical button is thus replaced merely by a hole made in the housing in order to provide the virtual button, thereby enabling the cost of manufacturing the electrical equipment to be reduced.

It should be observed that implementing the virtual button requires only one microphone. Furthermore, since control only requires a finger to be placed on the hole or merely to approach the hole, there is no need to tap on the housing. Thus, achieving detection depends neither on the characteristics of fingers (and in particular the length of a fingernail), nor on the force with which the finger taps the housing.

Furthermore, detection does not require any particular level of ambient noise, and it functions even if the surroundings are completely silent.

There is also provided electrical equipment as described above, wherein the microphone is a surface mount component that is mounted on a printed circuit of an electric circuit card positioned inside the housing parallel to a face of the housing in which the hole is formed.

There is also provided electrical equipment as described above, wherein sound insulating material is placed around the microphone between the housing and the circuit card.

There is also provided electrical equipment as described above, wherein the loudspeaker has a directivity pattern that is oriented towards a zone that does not include the microphone.

There is also provided electrical equipment as described above, wherein the microphone is positioned in an upper portion of the electrical equipment and wherein the directivity pattern of the loudspeaker is downwardly oriented.

There is also provided electrical equipment as described above, wherein the microphone is positioned in an upper portion of the electrical equipment and wherein the directivity pattern of the loudspeaker is horizontally oriented.

There is also provided electrical equipment as described above, wherein the emitted detection sound signal is a signal that is normally inaudible for a human being.

There is also provided electrical equipment as described above, wherein the emitted detection sound signal comprises a first run of first signals of non-zero amplitude and of first signals of zero amplitude.

There is also provided electrical equipment as described above, wherein the processor means are arranged to implement a bandpass filter around a frequency of the emitted detection sound signal.

There is also provided electrical equipment as described above, wherein the processor means are arranged at a time t to evaluate a present instantaneous power $P(t)$ of the received detection sound signal, to compare the present instantaneous power $P(t)$ with a past instantaneous power $P(t-T0)$, where $T0$ lies in the range 1 milliseconds (ms) to 500 ms, and if the ratio between the present instantaneous power and the past instantaneous power is below a predetermined power threshold, to deduce that a finger is positioned on or in the immediate proximity of the hole.

There is also provided electrical equipment as described above, wherein the emitter means are arranged to emit an emitted test sound signal comprising a second run of second signals of non-zero amplitude and of second signals of zero amplitude, wherein the processor means are arranged to acquire a received test sound signal, and wherein the processor means are arranged to evaluate an energy difference for the received test sound signal over its intervals corresponding to the second signals of non-zero amplitude and over its intervals corresponding to the second signals of zero amplitude, in order to define a target volume for the emitted test sound signal such that the energy difference is greater than a predetermined energy threshold, and to emit the emitted detection sound signal with the target volume.

There is also provided electrical equipment as described above, wherein the electrical equipment includes a plurality of microphones, each positioned in the proximity of a respective hole formed in the housing.

There is also provided electrical equipment as described above, wherein the processor means are arranged not to cause the predetermined action to be performed if the processor means detect that one or more objects are positioned on or in the immediate proximity of a plurality of holes simultaneously.

There is also provided electrical equipment as described above, wherein a distinct predetermined action is associated with each microphone and wherein, when the processor means detect that a finger is positioned on or in the immediate proximity of a particular hole, the processor means are arranged to cause the predetermined action associated with the microphone situated in the proximity of said particular hole to be performed.

There is also provided electrical equipment as described above, wherein the predetermined action is activating or deactivating voice interaction with a user.

There is also provided electrical equipment as described above, wherein the predetermined action is activating or deactivating a standby mode.

There is also provided electrical equipment as described above, the electrical equipment being a smartspeaker that performs a voice assistant function.

There is also provided a method of controlling electrical equipment as described above, the method comprising the steps of:

using the loudspeaker to emit an emitted detection sound signal;
using the microphone to receive a received detection sound signal;
using the received detection sound signal to detect in real time whether a user's finger is or is not positioned on or in the immediate proximity of the hole, and performing a predetermined action if a finger is positioned on or in the immediate proximity of the hole.

There is also provided a computer program including instructions for causing the above-described equipment to execute the steps of the control method as described above.

There is also provided a computer readable storage medium, having stored thereon the computer program as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
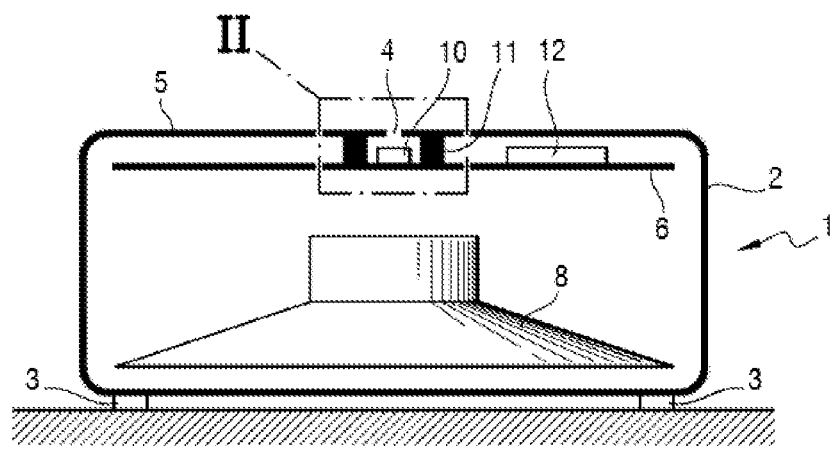
FIG. 1 is a section view on a vertical plane of electrical equipment of the invention.
Figure 2:
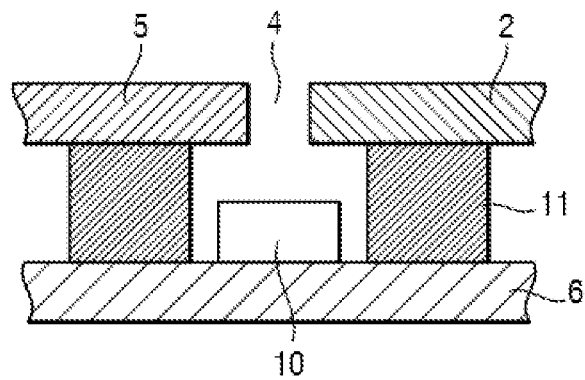
FIG. 2 is a detail view of FIG. 1.

With reference to FIGS. 1 and 2, in this example the electrical equipment of the invention is a smartspeaker 1 that performs a voice assistant function.

The smartspeaker 1 comprises firstly a housing 2. The term "housing" is used herein to mean the physical shell containing inside it the control components as described below of the smartspeaker 1. The housing 2 may comprise a plurality of portions and it may optionally include one or more potentially removable covers. The housing 2 may comprise one or more portions that are rigid, flexible, made of metal, made of plastics material, made of fabric, made of foam, etc.

The housing 2 also includes feet 3 that stand on any suitable support (e.g. a table or any other piece of furniture) when the smartspeaker 1 is in its nominal operating position, as shown in FIG. 1.

A hole 4 is formed in a top face 5 of the housing 2. The hole 4 passes through the housing 2. The hole 4 may be formed in any portion of the housing 2 (and possibly in a cover).

The smartspeaker 1 also includes an internal chassis (not shown in figures) incorporated inside the housing 2.

The smartspeaker 1 also includes an electric circuit card 6. The circuit card 6 is incorporated in the housing 2 by being fastened to the internal chassis. The circuit card 6 is positioned parallel to the top face 5 of the housing 2 and in its proximity. The distance between the circuit card 6 and the top face 5 of the housing 2 may lie in the range 5 millimeters (mm) to 1.5 centimeters (cm), for example.

The smartspeaker 1 also includes a loudspeaker 8 that is incorporated in the housing 2 by being fastened to the internal chassis. In this example, the loudspeaker 8 is "pointing downwards", i.e. when the smartspeaker 1 is in its nominal operating position, it presents a directivity pattern that is downwardly oriented.

The smartspeaker 1 also has a microphone 10 positioned inside the housing and in the proximity of the hole. In this example, the microphone 10 is a surface mount component that is mounted on a printed circuit of the circuit card 6. The microphone 10 is positioned facing the hole 4. In this example, the axis of the hole 4 passes through the center of the microphone 10.

It should be observed that the directivity pattern of the loudspeaker 8 is oriented towards a zone that does not include the microphone 10: specifically, the microphone 10 is positioned in a top portion of the smartspeaker 1 and the directivity pattern of the loudspeaker 8 is downwardly oriented (when the smartspeaker 1 is in its nominal operating position).

Sound insulating material is placed around the microphone 10 between the circuit card 6 and the housing 2. In this example, the sound insulating material is foam 11. The foam 11 serves to limit sound disturbances picked up by the microphone 10 and coming from the inside of the smartspeaker 1. By way of example, such sound disturbances could comprise interfering resonances inside the smartspeaker 1.

Likewise, the circuit 6 is fastened to the internal chassis of the smartspeaker 1 via a fastener part (not shown) made of flexible material. By way of example, the fastener part is a "Silentblock" damper, which, by way of example, is a part comprising natural rubber or elastomer and serving to absorb vibration and noise.

The fastener part serves to limit any direct transmission of vibration from the loudspeaker 8 to the microphone 10 via the internal chassis.

The smartspeaker 1 also includes emitter means and processor means.

The emitter means comprise electronic components, e.g. including an amplifier.

The processor means comprise a processor component 12 adapted to execute instructions of a program in order to perform the steps of the control method as described below. By way of example, the processor component 12 is a general-purpose processor, a processor specialized in signal processing (known as a digital signal processor (DSP)), a microcontroller, or indeed a programmable logic circuit such as a field programmable gate array (FPGA) or an application-specific integrated circuit (ASIC). The processor component 12 is mounted on the circuit card 6.

There follows a description of how the virtual button is provided on the smartspeaker 1 by using the means described above.

The emitter means act via the loudspeaker 8 to emit an emitted detection sound signal continuously (i.e. so long as the smartspeaker 1 is activated). Via the microphone 10, the processor component 12 acquires a received detection sound signal that results from the emitted detection sound signal propagating via the outside of the housing 2. From the received detection sound signal, the processor component 12 acts in real time to detect whether a user's finger is or is not in position on or in the immediate proximity of the hole 4.

The term "on or in the immediate proximity", is used to mean that the finger is placed on the hole 4 and covers it in full or in part, or else that the finger has merely approached the hole 4 from above and is at a short distance therefrom, e.g. lying in the range 0 to 10 mm.

The processor component 12 causes a predetermined action to be performed if the finger is positioned on or in the immediate proximity of the hole 4.

Specifically, when a finger (or any other object) is positioned on the hole 4 or in its immediate proximity, the received detection sound signal is highly attenuated, i.e. the energy or the instantaneous power of the received detection sound signal is greatly diminished. The processor component 12 detecting this attenuation serves to detect the presence of the user's finger and thus to detect the user's desire to cause the predetermined action to be performed by making use of the virtual button.

Using the foam 11 and the Silentblock damper, and the fact that the directivity pattern of the loudspeaker 8 is downwardly oriented towards a zone that does not contain the microphone 10, serves to ensure that the microphone 10 does not pick up the emitted detection sound signal as a result of it propagating through the inside of the housing 2, but picks it up solely as a result of it propagating via the outside of the housing 2. The energy level of the received detection sound signal and the variation in that level depend solely on whether or not an object is positioned on or in the immediate proximity of the hole 4.

By way of example, the emitted detection sound signal is a sinewave signal of constant frequency and amplitude.

The emitted detection sound signal is a signal that is normally inaudible for a human being. The frequency of the emitted detection sound signal lies within the operating ranges of the loudspeaker 8 and of the microphone 10.

By way of example, the frequency of the emitted detection sound signal is equal to 22 kilohertz (kHz). Specifically, the frequency range of human hearing typically extends from 20 hertz (Hz) to 20 kHz, such that a frequency of 22 kHz is inaudible. Also, consumer audio processing appliances (such as the smartspeaker 1) typically have a sampling frequency of 48 kHz, and are therefore capable of processing signals of frequencies below 24 kHz.

Advantageously, the emitted detection sound signal is modulated so as to be easily distinguished from background noise. For example, the emitted detection sound signal comprises a first run of first signals of non-zero amplitude and of first signals of zero amplitude. The durations of the intervals comprising the first signals of non-zero amplitude and of the intervals comprising the first signals of zero amplitude may be variable.

By way of example, the emitted detection sound signal may be made up of the following sequence, which is repeated "indefinitely":

a 22 kHz sinewave for 5 ms (thus constituting one of the first signals of non-zero amplitude);

silence for 5 ms (thus constituting one of the first silences);

a 22 kHz sinewave for 5 ms (thus constituting one of the first signals of non-zero amplitude);

silence for 10 ms (thus constituting one of the first silences).

The microphone 10 samples the received detection sound signal. Via the microphone 10, the processor component 12 acquires the received detection sound signal continuously.

Figure 3:
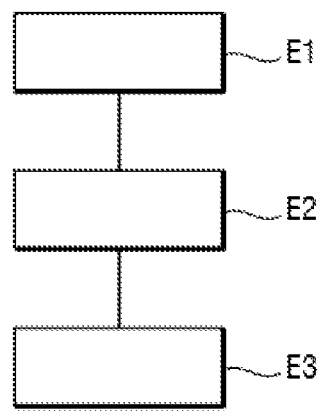
FIG. 3 shows steps of a method of processing a received detection sound signal.

With reference to FIG. 3, the processor component 12 then performs a processing method on the received detection sound signal in order to detect whether or not the user has placed a finger on or in the immediate proximity of the hole 4.

Firstly, the processor component 12 applies a bandpass filter around the frequency of the emitted detection sound signal (step E1). The bandpass filter is a filter that is relatively narrow and selective.

For example, when the emitted detection sound signal has a frequency of 22 kHz, the microphone 10 samples the received detection sound signal at a frequency of 48 kHz in order to produce a sampled signal. The processor component 12 applies the following filter to the sampled signal in order to obtain a filtered signal:

$$y(t)=0.00995 \times (x(t)-x(t-2))-1.9125 \times y(t-1)-0.9801 \times y(t-2)$$

where x(t) represents the sampled signal at the instant t and y(t) represents the filtered signal at the instant t.

Thereafter, the processor component 12 calculates the instantaneous power of the received detection sound signal by calculating the average of y(t)$^2$ over a short length of time (e.g. 1 ms)—step E2.

At time t, the processor component 12 thus evaluates the present instantaneous power P(t) of the received detection sound signal.

The processor component 12 then compares the present instantaneous power P(t) with a past instantaneous power P(t−T0). T0 lies in the range 1 ms to 500 ms. In this example, T0 is equal to 25 ms.

If the ratio of the present instantaneous power over the past instantaneous power is less than a predetermined power threshold, then the processor component 12 deduces that the access to the hole 4 has been shut off, at least in part, and thus that a finger is placed on or in the immediate proximity of the hole 4 (step E3).

In this example, the predetermined power threshold is equal to 25%, i.e. if the present instantaneous power is less than 25% of the past instantaneous power, then the processor component 12 considers that a finger is positioned on or in the immediate proximity of the hole 4.

Under such circumstances, the processor component 12 causes the predetermined action to be performed.

The predetermined action may consist in starting voice interaction with the user: as soon as the processor component 12 detects that the user has placed a finger on or in the proximity of the hole 4, it triggers a process of voice recognition and dialogue with the user. The predetermined action may also consist in deactivating voice interaction.

The predetermined action may also consist in activating or in deactivating a standby mode. Under such circumstances, in normal operation, the smartspeaker 1 listens continuously in order to detect a keyword in order to start interaction with the user. The functions of the smartspeaker 1 that enable the virtual button to be provided are also activated. In contrast, when operating in standby mode, all of the functions of the smartspeaker 1 are deactivated, except for those that enable the virtual button to be provided. Thus, each time the processor component 12 detects that the user has placed a finger on or in the immediate proximity of the hole 4, the processor component 12 causes the smartspeaker 1 to alternate between normal operation and standby operation.

The processor component 12 can determine automatically the power level that is appropriate for emitting the emitted detection sound signal.

To do this, the processor component 12 controls the emitter means to cause them to emit an emitted test sound signal.

The emitted test sound signal is an intermittent signal comprising a second run of second signals of non-zero amplitude and of second signals of zero amplitude.

The processor component 12 then acquires a received test sound signal. The processor component 12 evaluates the energy difference for the test sound signal received over its intervals that correspond to the second signals of non-zero amplitude, and over its intervals that correspond to the second signals of zero amplitude. The processor component 12 then adjusts the volume of the emitted test sound signal in order to obtain a target volume from which the energy difference becomes greater than a predetermined energy threshold. By way of example, the predetermined energy threshold is equal to 6 decibels (dB).

The processor component 12 then emits the emitted detection sound signal with the target volume.

Advantageously, this calibration, which is performed by emitting, receiving, and analyzing an emitted test sound signal, is performed in continuous manner. After attempting to detect a finger on or in the immediate proximity of the hole, and in the event that a finger is not detected, the volume of the emitted detection sound signal is adjusted accordingly using the target volume.

The main advantage of this calibration is to adapt automatically in the event of there being an external disturbing signal at the frequency of the test signal (22 kHz). It is thus preferable to perform this calibration continuously since a disturbing signal can appear or disappear at any time.

Nevertheless, it would also be possible to emit the emitted test sound signal only during a calibration stage at the end of manufacturing the smartspeaker 1, or else after the first time the user activates the smartspeaker 1.

Adjusting the volume also makes it possible to optimize the power of the emitted detection sound signal by limiting said power, while nevertheless enabling a finger on or in the immediate proximity of the hole 4 to be detected effectively. Limiting power also serves to limit the electricity consumption of the smartspeaker 1, and also to avoid pointlessly disturbing pets with a signal that is potentially audible for them and at a volume that is excessive.

The smartspeaker 1 may have a plurality of holes 4 and a plurality of microphones 10, each of which is positioned in the proximity of a respective one of the holes 4.

The same single predetermined action may be associated with all of microphones 10. The processor component 12 acquires the received detection sound signals via the various microphones 10, performs filtering on the received detection sound signals, and compares the instantaneous power (or energy) of the filtered signals. If the processor component 12 detects a drop in the instantaneous power of a single microphone 10, and thus if the processor component 12 detects that a finger has been placed on or in the immediate proximity of a single hole 4, the processor component 12 causes the predetermined action to be performed.

In contrast, if the processor component 12 detects an instantaneous power drop from a plurality of microphones 10 simultaneously, and thus if the processor component 12 detects that one or more objects have been positioned on or in the immediate proximity of a plurality of holes 4 simultaneously, then it considers that the drop in instantaneous power was caused by an accidental external event and it does not cause the predetermined action to be performed.

Alternatively, a distinct predetermined action may be associated with each microphone 10. Under such circumstances, if the processor component 12 detects an instantaneous power drop (or energy drop) on only one particular microphone 10, and thus if the processor component 12 detects that a finger is positioned on or in the immediate proximity of a single particular hole 4 (having said particular microphone 10 located in its proximity), the processor component 12 causes the predetermined action associated with said particular microphone 10 to be performed. This serves to provide a plurality of virtual buttons (one for each pair comprising a hole 4 and the microphone 10 positioned inside the housing in the proximity of said hole 4).

Naturally, the invention is not limited to the embodiment described, but covers any variant coming within the ambit of the invention as defined by the claims.

Naturally, the electrical equipment of the invention is not necessarily a smartspeaker, but it could be any other equipment having a microphone and a loudspeaker.

The positions of the microphone and of the loudspeaker may naturally be different from those described above.

In the description above, it is stated that it is advantageous for the directivity pattern of the loudspeaker to be oriented towards a zone that does not include the microphone. In the example used, the microphone is positioned in a top portion of the smartspeaker and the directivity pattern of the loudspeaker is downwardly oriented. It would naturally be possible to envisage using some other configuration. For example, the microphone may be positioned in a top portion of the smartspeaker and the directivity pattern of the loudspeaker could be horizontally oriented.

The invention claimed is:

1. Electrical equipment comprising:
   a housing having a hole formed therein;
   a microphone positioned inside the housing and in the proximity of the hole;
   a loudspeaker;
   emitter means arranged to emit an emitted detection sound signal via the loudspeaker;
   processor means arranged to acquire a received detection sound signal via the microphone, to detect in real time from the received detection sound signal whether a user's finger is or is not positioned on or in the immediate proximity of the hole, and if a finger is positioned on or in the immediate proximity of the hole to cause a predetermined action to be performed,
   wherein the processor means are arranged to implement a bandpass filter around a frequency of the emitted detection sound signal.

2. The electrical equipment according to claim 1, wherein the microphone is a surface mount component that is mounted on a printed circuit of an electric circuit card positioned inside the housing parallel to a face of the housing in which the hole is formed.

3. The electrical equipment according to claim 2, wherein sound insulating material is placed around the microphone between the housing and the circuit card.

4. The electrical equipment according to claim 1, wherein the loudspeaker has a directivity pattern that is oriented towards a zone that does not include the microphone.

5. The electrical equipment according to claim 4, wherein the microphone is positioned in an upper portion of the electrical equipment and wherein the directivity pattern of the loudspeaker is downwardly oriented.

6. The electrical equipment according to claim 4, wherein the microphone is positioned in an upper portion of the electrical equipment and wherein the directivity pattern of the loudspeaker is horizontally oriented.

7. The electrical equipment according to claim 1, wherein the emitted detection sound signal is a signal that is normally inaudible for a human being.

8. The electrical equipment according to claim 1, wherein the emitted detection sound signal comprises a first run of first signals of non-zero amplitude and of first signals of zero amplitude.

9. The electrical equipment according to claim 1, wherein the processor means are arranged at a time t to evaluate a present instantaneous power P(t) of the received detection sound signal, to compare the present instantaneous power P(t) with a past instantaneous power P(t−T0), where T0 lies in the range 1 ms to 500 ms, and if the ratio between the present instantaneous power and the past instantaneous power is below a predetermined power threshold, to deduce that a finger is positioned on or in the immediate proximity of the hole.

10. The electrical equipment according to claim 1, wherein the emitter means are arranged to emit an emitted test sound signal comprising a second run of second signals of non-zero amplitude and of second signals of zero amplitude, wherein the processor means are arranged to acquire a received test sound signal, and wherein the processor means are arranged to evaluate an energy difference for the received test sound signal over its intervals corresponding to the second signals of non-zero amplitude and over its intervals corresponding to the second signals of zero amplitude, in order to define a target volume for the emitted test sound signal such that the energy difference is greater than a predetermined energy threshold, and to emit the emitted detection sound signal with the target volume.

11. The electrical equipment according to claim 1, wherein the electrical equipment includes a plurality of microphones, each positioned in the proximity of a respective hole formed in the housing.

12. The electrical equipment according to claim 11, wherein the processor means are arranged not to cause the predetermined action to be performed if the processor means detect that one or more objects are positioned on or in the immediate proximity of a plurality of holes simultaneously.

13. The electrical equipment according to claim 11, wherein a distinct predetermined action is associated with each microphone and wherein, when the processor means detect that a finger is positioned on or in the immediate proximity of a particular hole, the processor means are arranged to cause the predetermined action associated with the microphone situated in the proximity of said particular hole to be performed.

14. The electrical equipment according to claim 1, wherein the predetermined action is activating or deactivating voice interaction with a user.

15. The electrical equipment according to claim 1, wherein the predetermined action is activating or deactivating a standby mode.

16. The electrical equipment according to claim 1, the electrical equipment being a smartspeaker that performs a voice assistant function.

17. A method of controlling electrical equipment according to claim 1, the method comprising the steps of:
   using the loudspeaker to emit an emitted detection sound signal;
   using the microphone to receive a received detection sound signal;
   using the received detection sound signal to detect in real time whether a user's finger is or is not positioned on or in the immediate proximity of the hole, and performing a predetermined action if a finger is positioned on or in the immediate proximity of the hole.

18. A non-transitory computer readable storage medium having stored thereon instructions configured for execution by a computer to perform the method of claim 17.

* * * * *